United States Patent [19]

Duh et al.

[11] Patent Number: 5,391,694
[45] Date of Patent: Feb. 21, 1995

[54] SOLID STATE POLYMERIZATION OF POLYESTERS WITH LOW DIFFUSION RESISTANCE PREPOLYMER GRANULES

[75] Inventors: Ben Duh; William C. T. Tung, both of Tallmadge, Ohio

[73] Assignee: Shell Oil Company, Houston, Tex.

[21] Appl. No.: 137,876

[22] Filed: Oct. 15, 1993

[51] Int. Cl.⁶ .................. C21B 7/00; C08G 63/00; C08F 6/00
[52] U.S. Cl. .................. 528/272; 264/143; 264/150; 528/308.2; 528/481; 528/502; 521/182; 521/79
[58] Field of Search ............... 521/182, 79; 528/272, 528/308.2, 481, 502; 264/143, 150

[56] References Cited

U.S. PATENT DOCUMENTS

| | | |
|---|---|---|
| 3,586,647 | 6/1971 | Kremer . |
| 4,755,587 | 7/1988 | Rinehart . |
| 4,792,573 | 12/1988 | Cohn . |
| 4,849,497 | 7/1989 | Scannapieco ............ 521/182 |
| 4,876,326 | 10/1989 | Rinehart . |
| 4,977,196 | 12/1990 | Scannapieco . |

FOREIGN PATENT DOCUMENTS

WO92/02569 2/1992 WIPO .

OTHER PUBLICATIONS

Herman Ludewig, "Polyester Fibres" Chemistry and Technology, pp. 161–166, p. 217, Wiley, 1964.

Primary Examiner—Morton Foelak
Attorney, Agent, or Firm—Denise Y. Wolfs; Douglas Baldwin

[57] ABSTRACT

Polyester prepolymer granules with open-ended cavities provide greatly improved solid state polymerization rates by improving reaction by-product diffusion characteristics.

17 Claims, 2 Drawing Sheets

Comparison of Solid State Polymerization Rates of PEN Standard Pellets And Pellets with Open-Ended Cavities

SOLID STATE POLYMERIZATION OF POLYESTERS WITH LOW DIFFUSION RESISTANCE PREPOLYMER GRANULES

BACKGROUND

This invention relates to solid state polymerization of low diffusion resistance granules of polyester prepolymers.

High molecular weight polyesters, such as poly(ethylene terephthalate) (PET) and poly(ethylene naphthlate) (PEN), are usually produced by a combination of melt polymerization and solid state polymerization (SSP) processes. Polyester prepolymers with relatively low molecular weight (evidenced by a relatively low intrinsic viscosity, "I.V.") are produced in a melt polymerization process. The prepolymer melt is typically extruded through a die with multiple orifices to form molten strands that are quenched, solidified, and chopped into granules or pellets. There are, of course, other methods to convert polyester melt into granular form. Hereafter, for convenience, polyester prepolymer granules, regardless of their shape or method of forming, will be referred to as pellets. The prepolymer pellets are further polymerized in solid phase to a desired high molecular weight or I.V., at temperatures below the melting point but above the glass transition temperature.

Generally, the shape of the orifices in the extrusion die used to pelletize prepolymer is round, but orifices of other simple shapes can be used. Drooping of the molten prepolymer strands and/or some flattening actions of the pelletizing equipment, cause the cross-section of the resulting prepolymer pellets to be somewhat elongated and not exactly round; i.e., approximately elliptical.

Solid state polymerization (SSP) is conducted under vacuum or in a stream of purge gas such as nitrogen. Overall, SSP involves two major steps: (1) chemical reactions and (2) diffusion of reaction by-products. The chemical reactions are transesterification and esterification.

Transesterification generates ethylene glycol (EG) as the by-product and esterification generates water as the by-product. To force the polyester prepolymer to further polymerize, reaction by-products must be effectively removed as they are generated. By-products generated by the reactions diffuse from the interior to the surfaces of the pellets where they are removed by vacuum or an inert gas stream. Since resistance to by-product diffusion from the surfaces of the pellets to the bulk of the gas phase is negligible, only the chemical reaction rates and by-product diffusion from the interior to the surfaces of the pellets are major factors in polymerization performance.

Enhanced chemical reaction rates are achieved by using the maximum allowable reaction temperature, slightly below the temperature at which polymer pellets start to stick together or to the reactor wall.

Resistance to diffusion of by-products can be reduced by reducing prepolymer particle size. However, at a fixed temperature, smaller particles have higher tendencies to stick. Therefore, lower reaction temperatures are required if particle size is reduced. Moreover, excessively small particles are hard to handle. Therefore, it is no accident that most of the polyester pellets weigh between 0.015 to 0.03 grams per pellet. Another way to reduce the by-product diffusional resistance while maintaining the pellet size is to shape the pellet cross-section like stars, crosses, dog bones and the like. However, such shapes are generally undesirable because the increased inter-pellet contact area of these shapes increases the tendency to stick. Therefore, practically all standard prepolymer pellets have round, elliptical, square, rectangular or other simple cross-sections.

Heretofore, two methods have been proposed to reduce diffusional resistance to by-products while maintaining a suitable prepolymer particle size and without increasing polymer sticking tendency. U.S. Pat. No. 3,586,647 proposes foamed pellets which are formed by incorporating nitrogen or a foaming agent into the prepolymer melt before pelletizing. Foamed pellets polymerize only slightly faster than solid pellets. In U.S. Pat. No. 4,755,587 it is proposed to use porous pellets with interconnected voids. Although porous pellets solid state polymerize much faster than standard pellets, the formation of porous pellets requires expensive additional steps, such as grinding, compacting, granulating, and classifying. Moreover, porous pellets tend to generate large amounts of fines.

It is the purpose of this invention to improve the polymerization process by providing an improved polyester prepolymer pellet form that offers reduced diffusion resistance to the reaction by-products and, therefore, higher polymerization rates, without the disadvantages of existing techniques.

SUMMARY OF THE INVENTION

This invention is, in one embodiment, a polyester granule having improved gas diffusion characteristics that can be solid state polymerized into a high molecular weight polyester comprising a polyester prepolymer formed into shaped pellets of a size and weight suitable for solid state polymerization and having one or more open-ended cavities.

In another embodiment the invention is an improvement in a process for solid state polymerizing a polyester prepolymer into a high molecular weight polyester at elevated temperature, the improvement that comprises providing a polyester prepolymer that is formed into shaped pellets of a size and weight suitable for solid state polymerization, each having one or more open-ended cavities.

DETAILED DESCRIPTION

Figure 1:
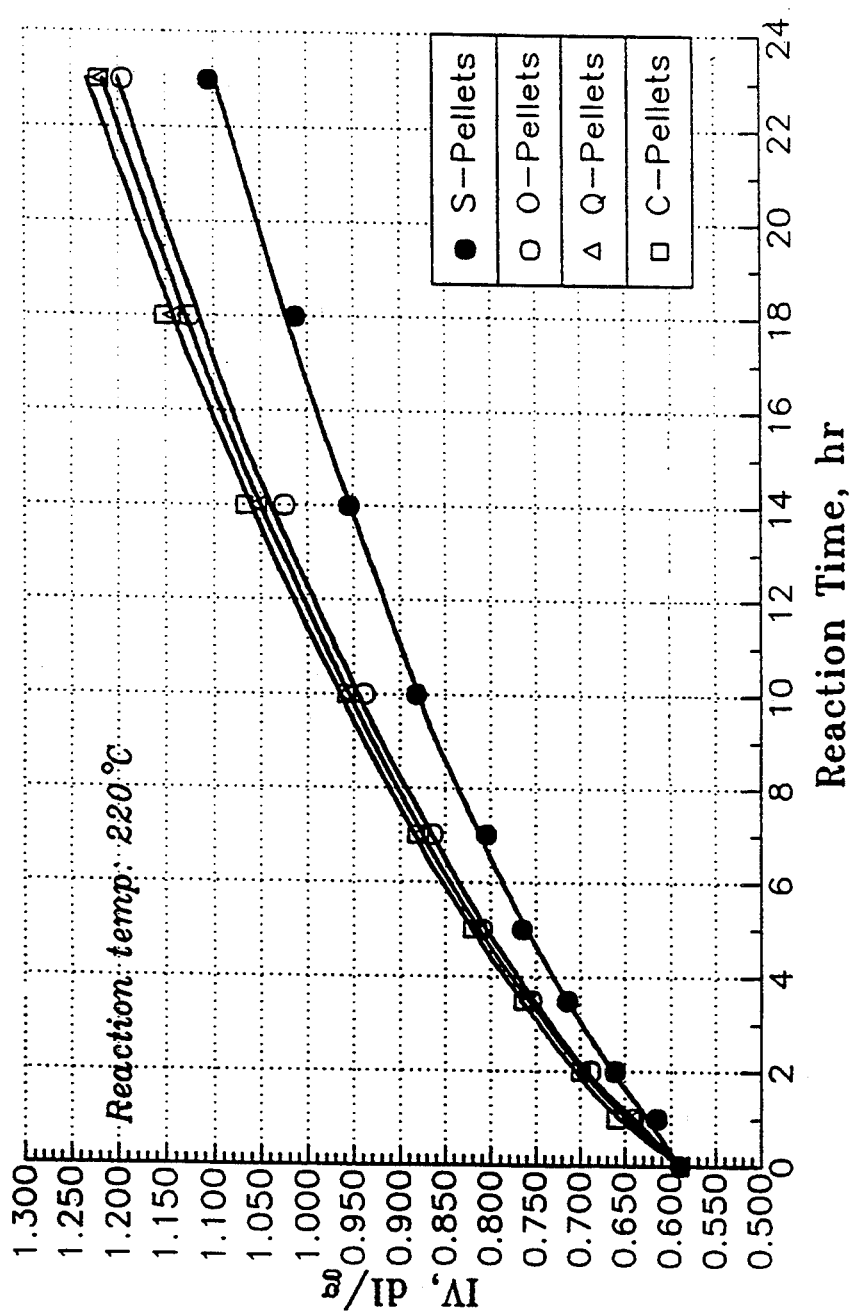
FIG. 1 is a plot of polymer I.V. against reaction time for the solid state polymerization of PET pellets with different cross sections.

This invention involves the solid state polymerization of polyester prepolymers that are shaped in a manner to provide one or more open-ended cavities inside each shaped particle. The shape, size and capability to effectively reduce gas diffusion resistance results in greatly improved solid state polymerization rates that provide a number of advantages in both newly designed polymerization plants as well as in existing plants. A listing of some of these advantages follows this detailed description.

The invention is applicable to virtually any polyester that can be solid state polymerized. The most common polyesters suitable for use in the invention have at least about 75 mole percent of their acid moieties provided by an aromatic dicarboxylic acid, such as terephthalic acid, isophthalic acid, or a naphthalenic dicarboxylic acid (preferably 2,6-) with the diol moieties provided by glycols such as ethylene glycol, butylene glycol, 1,4-dimethylol cyclohexane and the like or aromatic diols such as hydroquinone and catechol. Such polyesters can contain other dicarboxylic acids such as adipic acid, isophthalic acid, sebacic acid, and the like. Poly(ethylene terephthalate) (PET), poly(ethylene isophthalate), poly(ethylene naphthalate), and poly(butylene terephthalate) homopolymers are representative examples of such polyesters. Poly(ethylene naphthalate)s are especially suitable. Blends of various polyesters can also be polymerized in the process.

The diacid component in the polyesters is normally comprised of alkyl dicarboxylic acids which contain from 4 to 36 carbon atoms, diesters of alkyl dicarboxylic acids which contain from 6 to 38 carbon atoms, aryl dicarboxylic acids which contain from 8 to 20 carbon atoms, diesters of aryl dicarboxylic acids which contain from 10 to 22 carbon atoms, alkyl substituted aryl dicarboxylic acids which contain from 9 to 22 carbon atoms, or diesters of alkyl substituted aryl dicarboxylic acids which contain from 11 to 22 carbon atoms. The preferred alkyl dicarboxylic acids will contain from 4 to 12 carbon atoms. Some representative examples of such alkyl dicarboxylic acids include glutaric acid, adipic acid, pimelic acid, and the like. The preferred diesters of alkyl dicarboxylic acids will contain from 6 to 12 carbon atoms. A representative example of such a diester of an alkyl dicarboxylic acid is dimethyl azelate. The preferred aryl dicarboxylic acids contain from 8 to 16 carbon atoms. Some representative examples of aryl dicarboxylic acids are terephthalic acid, isophthalic acid, and orthophthalic acid. The preferred diesters of aryl dicarboxylic acids contain from 10 to 18 carbon atoms. Some representative examples of diesters of aryl dicarboxylic acids include dimethyl terephthalate, dimethyl isophthalate, dimethyl orthophthalate, dimethyl naphthalate, diethyl naphthalate and the like. The preferred alkyl substituted aryl dicarboxylic acids contain from 9 to 16 carbon atoms and the preferred diesters of alkyl substituted aryl dicarboxylic acids contain from 11 to 15 carbon atoms.

The diol component of the polyester prepolymers is normally comprised of glycols containing from 2 to 12 carbon atoms, glycol ethers containing from 4 to 12 carbon atoms, and polyether glycols having the structural formula

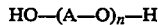

HO—(A—O)$_n$—H wherein A is an alkylene group containing from 2 to 6 carbon atoms and wherein n is an integer from 2 to 400.

Branched polyester prepolymers can also be used. Such branched polyesters normally contain branching agents that have three or more functional groups; preferably three or four. Reactive functional groups can be carboxyl or aliphatic hydroxyl groups and can optionally contain both carboxyl groups and hydroxyl groups. Examples of acidic branching agents include trimesic acid, trimellitic acid, pyromellitic acid, butane tetracarboxylic acid, naphthalene tricarboxylic acids, and cyclohexane-1,3,5-tricarboxylic acids. Representative examples of hydroxyl branching agents (polyols) include glycerin, trimethylol propane, pentaerythritol, dipentaerythritol, 1,2,6-hexane triol, and 1,3,5-trimethylol benzene. Generally, from 0 to 3 percent (based upon the total diol component) of a polyol containing from 3 to 12 carbon atoms will be used.

High strength polyesters that utilize at least one bis-hydroxyalkyl pyromellitic diimide in their diol component such as those described in U.S. Pat. No. 4,605,728 can also be used.

The polyester prepolymers (starting polyesters) may be made by any suitable method but are typically prepared by conventional melt polymerization techniques using temperatures, catalysts, and stabilizers well known in the polyester art. These polyester prepolymers have a relatively low initial starting I.V.. Prepolymers should preferably have a starting I.V.(as measured in a 60:40 by weight phenol:1,1,2,2-tetrachloroethane solvent system at a temperature of 30° C.) of from about 0.25 dl/g to about 0.75 dl/g. An I.V. of 0.25 dl/g is useful because it has been found to be about the lower limit that PET can be pelletized without shattering.

In the practice of this invention, the prepolymer is formed into shaped pellets (granules) with one or more open-ended cavities prior to solid state polymerization. Each of the pellets contains one or more open-ended cavities but retains the same general outer cross-sectional shape as standard solid pellets. Pellets will normally weigh from about 0.1 grams to 10 grams per 100 pellets. Pellets weighing from about 1 to 3 grams per 100 pellets are commonly used commercially and are preferred. An "open-ended" cavity is a cavity or hole with at least one end or side open to allow the carrier gas to enter the interior of pellets. It may be open on both ends and may or may not be open to the side. Suitable pellets can be advantageously formed by extruding the prepolymer through a specially designed die, quenching the extruded strands and chopping the solidified strands into pellets. The cavities in the pellets formed in this way are usually open at both ends. Pellets with both ends open are preferred. If one of the cavities is also open to the side, there will be an open gap on the side of the pellet. The pellets will generally be cut into lengths of from about 1 mm to 10 mm. If too short, they tend to shatter and form fines and if too long they have a greater tendency to stick. Lengths of 2 to 3 mm are preferred for pellets in the size range of about 1 to 3 grams per 100 pellets.

All else being equal, the sticking tendencies of polymer pellets during SSP increase with increasing specific inter-pellet contact area, which is defined as the inter-pellet contact area per unit weight of polymer. With similar general cross-sectional shape and length as standard pellets, the preferred pellets with cavities have approximately the same sticking tendency as the standard pellets. The presence of one or more cavities in each pellet greatly shortens the by-product mean diffusion path and increases surface area thereby lowering the overall by-product diffusional resistance within the pellet. Furthermore, the open cavities allow the purge gas to flow into or pass through the interior of the pellets to sweep away reaction by-products as soon as they diffuse to the inner surfaces. Therefore, polyester prepolymer pellets with open-ended cavities solid state polymerize much faster than foamed polyester prepolymer pellets with equal void fraction.

The simplest pellets with open-ended cavities are those with "C"-shaped or "O"-shaped cross-sections formed by a extrusion-pelletizing technique. These pellets can be produced by discharging the prepolymer melt from the melt reactor through an extrusion die having "C"-shaped orifices, quenching the extruded strands, and chopping the solidified strands with a pelletizer. As the extruded melt strands emerge from the die face, each will have a "C"-shaped cross-section. This allows air to enter the interior of each forming strand. Depending on the design of the die orifices, the polymer properties, and the extrusion conditions, the gaps of the extruded strands may or may not close to form tubes. If the gaps close, pellets with "O"-shaped cross-sections result. Otherwise, pellets with "C"-shaped cross-sections result. In general, if the gap in each die orifice is narrow enough, the polymer I.V. is high enough, and/or the die temperature is low enough, pellets with "O"-shaped cross-sections will be produced. For convenience, pellets with "C"- and "O"-shaped cross-sections are referred to as C-pellets and O-pellets respectively. The cavity in a C-pellet is open to the side but the cavity in an O-pellet is not. The general shape of the cross-sections of C-pellets and O-pellets are approximately elliptical although the general orifice shape of the die used may be round.

To prevent possible interlocking of C-pellets, and thus polymer sticking tendency, the gap in each C-pellet should be narrower than half the pellet diameter, preferably narrower than one fifth the pellet diameter.

Prepolymer pellets with multiple open-ended cavities can also be produced using properly designed extrusion dies. Since dies that produce pellets with multiple cavities are more difficult to design and fabricate it is generally preferred that the number of cavities in each pellet be limited.

For some applications it may be desirable to use extrusion dies with mandrels or similar devices. A mandrel is a hollow pin inserted in the center of a die orifice that forms the cavity. Air or nitrogen can be introduced though the center of the mandrel to fill the center of the extrudate, thus reducing the possibility of the cavity closing when quenched or in further processing.

Although it is preferable to produce prepolymer pellets with open-ended cavities by simply replacing a standard melt reactor discharging die with a die having "C"-shaped or other desired shaped orifices, it is possible to convert standard pellets with an additional extrusion step. Although the general cross-sectional shape of the pellets with open-ended cavities is preferably round or elliptical, it may be approximately square, rectangular, or of other simple geometrical shape.

For example, various shapes, such as triangles, rounded triangles and squares can be formed by the so-called adhesive profile extrusion techniques disclosed in the book "Polyester Fibres" Chemistry and Technology, by Herman Ludewig, Wiley Publishing, 1964. While this book discusses fiber shapes, hollow strands chopped into pellets are formed in the same manner.

For solid state polymerization it is necessary that the prepolymer be partially crystalline to reduce sticking. Crystallinity should generally be above about 30 percent and more typically above about 40 percent. Since extruded pellets will be substantially amorphous, it is necessary to process the pellets to increase crystallinity to the desired level. This is generally done by heating. Crystallization is carried out in any suitable equipment in which the polyester granules can be heated to crystallization temperatures without sticking. Agitation normally helps prevent sticking. Crystallization can also be carried out in a fluidized bed crystallizer. Fluidization is accomplished by utilizing a gas flow rate sufficient to cause the pellets to be fluidized in the crystallizer with or without mechanical vibration. Inert gas or air can be used. Since very large quantities are required for fluidization, air is most economical.

Crystallization residence time is generally in the range of about 2 to about 20 minutes and preferably from about 5 to about 10 minutes depending on temperature. In the case of poly(ethylene terephthalate), air at temperatures in the range of about 140° C. to about 215° C. is used for heating. Air temperatures in the range of about 190° C. to about 200° C. are preferred.

Density is a convenient measure of crystallinity and, in general, poly(ethylene terephthalate) prepolymer is suitably crystallized to a density of at least about 1.37 g/cc. A density of at least about 1.38 g/cc is preferred and 1.39 g/cc more preferred.

The polyester granules can also be crystallized in a high frequency energy field ranging from about 20 megahertz to about 300 megahertz as described in greater detail in U.S. Pat. No. 4,254,253.

Solid state polymerization (SSP) of the pellets with open-ended cavities, low diffusion resistance, pellets is conducted at conditions suitable for polymerization of standard solid pellets of similar size. Generally SSP is conducted at a temperature of about 10° to about 50° C. below the melting point of the prepolymer. For PET a temperature range of 200° to 245° C., and preferably 210° to 230° C. is appropriate. The polymerization is conducted under vacuum or in a stream of inert gas in a suitable reactor. Appropriate conditions are the same as suitable for standard pellets or porous pill pellets. Suitable conditions are detailed in U.S. Pat. No. 4,977,196 at col. 8, line 45 to col. 10, line 62 as well as in numerous other patents including U.S. Pat. No. 4,755,587, U.S. Pat. No. 4,876,326 and U.S. Pat. No. 4,849,497. The disclosure of U.S. Pat. No. 4,977,196 is incorporated herein by reference.

The advantages of the prepolymer pellets with open-ended cavities and other aspects of this invention are demonstrated in the following Illustrative Embodiments.

ILLUSTRATIVE EMBODIMENTS

EXAMPLE 1

One standard strand die (Die S) and two "C"-profile dies (Dies A and B) were used to prepare standard and pellets with open-ended cavities of PET prepolymer having an I.V. of 0.59 dl/g and a carboxyl content of 27 meg/kg for solid state polymerization tests. The standard strand die had a 3/16 inch diameter orifice. Each of the two "C"-profile dies has a "C"-shaped orifice. The dimensions of the orifice of each of the two "C"-profile dies is defined by two concentric circles and a gap. The inner circle and the gap make up the "land" area within the orifice. The orifice dimensions of the three dies are as follows:

| Die | OD, in | ID, in | Gap, in |
|-----|--------|--------|---------|
| S | 3/16 | — | — |
| A | ¼ | 1/16 | 1/48 |
| B | ¼ | 3/32 | 1/32 |

It is not necessary that the two circles that define the orifice of a "C"-profile die be concentric. Both Die A and B are examples of the simplest designs. The three dies were used in conjunction with a 1¼ inch laboratory extruder and a pelletizer to prepare pellets with open-ended cavities and standard pellets. Four different types of PET prepolymer pellets, each with different cross-sections, prepared using the three dies were chosen for the solid state polymerization (SSP) tests. Pellet preparation resulted in practically no change in I.V. or carboxyl content.

Table I list the characteristics of the pellets and the extrusion conditions used to prepare them. The four types of pellets are designated S-Pellets, O-pellets, Q-Pellets, and C-pellets respectively. S-Pellets were standard solid pellets prepared with Die S; they were used as the control. O-Pellets were pellets with "O"-shaped cross-sections prepared with die A. Q-Pellets and C-Pellets were pellets with "C"-shaped cross-sections prepared with Die B. The main difference between Q-Pellets and C-Pellets was in the dimension of the gap; Q-Pellets had very narrow gaps and "C"-Pellets had wider gaps.

Although the standard strand die used to prepare the S-Pellets has a round orifice, the cross-sections of the S-pellets were elongated because the melt strands drooped before quenching. Each of the three types of pellets with open-ended cavities were prepared using a "C"-profile die with the land gap of the die orifice oriented upward. As the melt strands cooled, the gaps in the strand tended to close or shrink back. These actions had the effect of offsetting the elongation of the cross-section caused by drooping. Therefore, all three types were more nearly round in cross-section than standard pellets. This is evidenced by their lower axis ratios. This is beneficial because the less elongated the cross-sections, the lower the pellet sticking tendency during solid state polymerization. All four types of pellets had nearly equal average pellet weight (between 1.82 and 1.84 grams per 100 pellets). Since the standard pellets have more elongated or elliptical cross-sections, they will have a somewhat higher sticking tendency than the three types of pellets with open-ended cavities. If the cross-sections were the same, the sticking tendency would be the same. The four types of PET pellets were solid state polymerized in a small scale static bed reactor at the same SSP temperature to demonstrate the SSP rate advantages of the three types of pellets with open-ended cavities over standard pellets.

The static-bed reactor used was made from a 24-inch long glass tube with 1-inch ID. The bottom of the reactor was connected to a small purge-gas supply tube which coiled up around the reactor. The only purge gas used was nitrogen. The reactor with its purge-gas supply tube was immersed in a thermostated oil bath that heated the reactor and the incoming nitrogen. For each SSP run, 80 grams of PET pellets were used. A stream of nitrogen was passed through the reactor at a rate of 18 standard cubic feet per hour at all times during the run. Because of the long length of the purge-gas supply tube immersed in the oil bath, the nitrogen was heated to the oil temperature as it reached the bottom of the reactor.

In each run, the pellets were first crystallized and dried at 180° C. for 60 minutes. Then reactor temperature was raised to 220° C. over 10 minutes. The SSP temperature of 220° C. was used because it is near the maximum reactor temperature allowable in the continuous commercial-scale SSP operations in the production of high I.V. PET. The SSP step lasted 23 hours. Samples were taken at various intervals for I.V. tests. Table II lists the I.V.'s of the samples taken during the runs.

The I.V. data listed in Table II were further plotted against the SSP time in FIG. 1 to compare the SSP rates of the four types of pellets. It can be seen from FIG. 1 that all the three types of pellets with open-ended cavities solid state polymerize much faster than the standard pellets.

C-Pellets, with largest cavities and open gaps, solid state polymerize fastest: O-Pellets, with the smallest cavities and with no open gaps, polymerize more slowly, although not by much.

From FIG. 1, the reaction times required for the four types of pellets to achieve two product I.V.'s, 0.84 and 0.95 dl/g, were determined. These I.V.'s are required for bottle and food tray applications respectively. From these SSP time requirements and the bulk density data, the average SSP rates, the SSP rate ratios, and the productivity advantages over the standard pellets were calculated for the production of 0.84 and 0.95 I.V. products. The result are listed in Table III.

It can be seen from Table III that, between I.V.'s of 0.59 and 0.84 dl/g, O-Pellets, Q-Pellets, and C-Pellets solid state polymerize faster than the standard pellets by 34.4, 41.3, and 46.2 percent respectively. Since productivity of a continuous SSP process is based on polymer weight per hour, productivity advantages of the pellets with open-ended cavities over the standard pellets can be calculated by taking into account the bulk densities of the four types of pellets. They are: 29.3, 31.9, and 30.2 percent respectively for O-Pellets, Q-pellets and C pellets. It can be seen that the best productivity improvement is realized by replacing the standard pellets with Q-Pellets, which have "C"-shape cross-sections with very narrow open gaps. Thus, Q-pellets appear to have the best combination of SSP rate and bulk density among the three types of pellets with open-ended cavities.

EXAMPLE 2

The standard die and Die B used in Example 1 were used to prepare standard solid pellets and pellets with open-ended cavities of poly(ethylene naphthalate) (PEN) for SSP tests. The PEN prepolymer used had an I.V. of 0.48 dl/g as measured in a 60:40 phenol:tetrachloroethane solvent system at a temperature of 30° C. and a carboxyl content of 12 meg/kg. Pellet preparation had little or no effect on I.V. or carboxyl content. The standard pellets obtained had a pellet weight of 1.98 grams per 100 pellets, a major axis of 2.58 mm, a minor axis of 2.00 mm, and a bulk density of 0.78 g/cc. The pellets with open-ended cavities prepared with Die B had a pellet weight of 1.97 grams per 100 pellets, an "O"-shaped cross-section with 2.50 mm major axis and 2.38 mm minor axis, an approximate cavity diameter of 0.71 mm, and a bulk density of 0.71 g/cc. Pellet length was 3 mm for both types of pellets.

Figure 2:
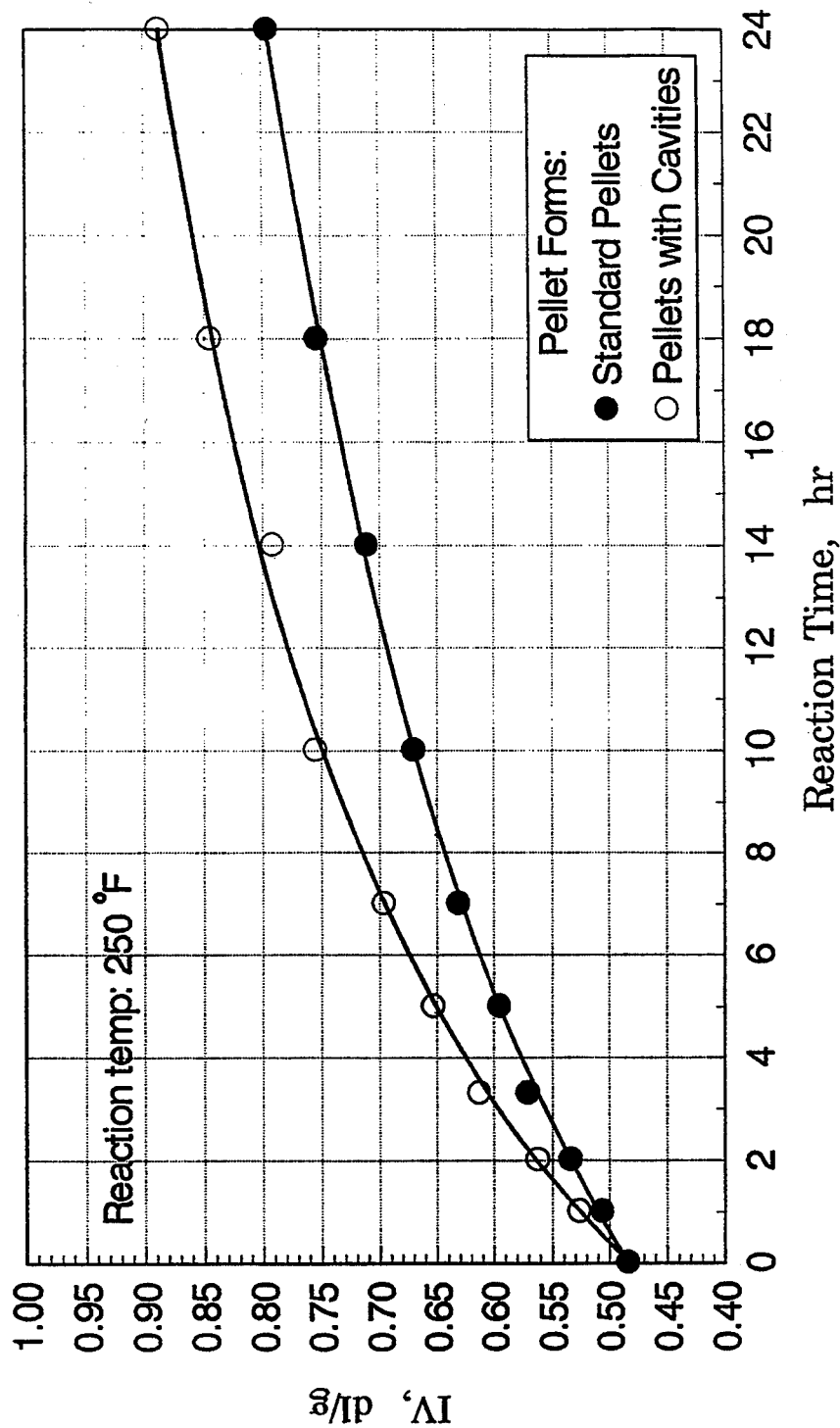
FIG. 2 is a plot of polymer I.V. against reaction time for the solid state polymerization of PEN standard pellets and pellets with open-ended cavities.

These two types of PEN prepolymer pellets were solid state polymerized in the same small-scale static-bed reactor used in Example 1. Except for an additional devolatilization step, the SSP experimental procedures used in this example were similar to those used in Example 1. For each run, the PEN pellets were first devolatilized at 120° C. for 4 hours. Then the PEN pellets were crystallized and dried at 200° C. for 1 hour. Then the bed temperature was raised to 250° C. to effect SSP which lasted 24 hours. At all times throughout the run, the polymer bed was purged with a stream of nitrogen. Table IV lists the I.V.'s of the samples taken during the SSP runs with the PEN standard pellets and pellets with open-ended cavities. The I.V. data in Table IV were also plotted in FIG. 2 to compare the SSP rates of these two types of PEN pellets.

Two major applications of high I.V PEN are packaging and industrial fiber. Packaging applications require an I.V. of about 0.65 dl/g, and industrial applications, about 0.75 dl/g. From FIG. 2, the standard pellets (S-pellets) required 8.3 and 18.0 hours, whereas the pellets with open-ended cavities (O-Pellets) required 4.9 and 10.1 hours respectively to achieve these I.V.'s. Thus the pellets with open-ended cavities solid state polymerized faster than the standard pellets by 69 percent between 0.48 and 0.65 dl/g, and by 78 percent between 0.48 and 0.75 dl/g. Taking into account the lower bulk density of the pellets with open-ended cavities, productivity gains of 54 and 62 percent respectively can be achieved by replacing the standard pellets with the pellets with open-ended cavities in the production of PEN resins for packaging and industrial fiber applications.

Compared with Example 1, it can be seen that even greater productivity gains can be realized with PEN than with PET by the use of the prepolymer pellets of this invention. This is because PEN has a lower vapor permeability or higher vapor barrier properties than PET.

Some advantages of this invention

Prepolymer pellets with open-ended cavities offer the following advantages over standard prepolymer pellets:

Examples 1 and 2 demonstrate that pellets with open-ended cavities solid state polymerize much faster than standard pellets. Therefore, with an existing SSP plant, greater productivity can be achieved by using pellets with open-ended cavities. In a new plant a smaller SSP reactor is required for equal productivity. In both cases, the production costs are lower.

Even if I.V. is uniform throughout each prepolymer pellet before SSP, it will vary within the pellet after SSP. This is because of diffusional differences of by-products from within the pellet. As a result, the I.V. will be highest at the surface and lowest at the center of a solid pellet. Since the maximum by-product diffusion path length can be more than halved by introducing a cavity in the pellet, such pellets have a much narrower I.V. distribution than standard pellets. Narrower I.V. distribution offers better polymer properties and processability. This is especially important in extrusion-blow molding.

Because of the higher SSP rates of pellets with open-ended cavities, the capability of an existing SSP process can be enhanced. For example, in a continuous SSP reactor with a residence time of 10 hours, the highest achievable product I.V. is, as shown in FIG. 1, about 0.88 dl/g with standard PET prepolymer pellets; sufficient for bottle application but insufficient for food tray application. If Q-Pellets or C-Pellets are used, products with I.V.'s exceeding 0.95 dl/g are obtained; sufficient for bottle and food tray applications. The use of pellets with open-ended cavities enables an existing SSP process to produce higher molecular weight products for more demanding applications.

Use of pellets with open-ended cavities can also enable lowering prepolymer I.V. while maintaining the productivity and high product I.V. on an existing SSP line. Lower prepolymer I.V. leads to greater productivity for the melt process used to produce the prepolymer. Obviously, with pellets with open-ended cavities, not only higher molecular weight products can be produced with an existing SSP process, but the feed polymer I.V. can also be lowered.

Low acetaldehyde contents are desirable for bottle resins. By using pellets with open-ended cavities with lower I.V., products with lower acetaldehyde content can be obtained without sacrificing productivity.

TABLE I

Pellet Characteristics and Extrusion Conditions used to Prepare Them

| Pellet Shape | S | O | Q | C |
| --- | --- | --- | --- | --- |
| Die Used | Standard | A | B | B |
| Barrel temp, °F. | 540 | 540 | 540 | 540 |
| Die temp, °F. | 540 | 490 | 490 | 540 |
| Screw RPM | 33 | 33 | 33 | 50 |
| Pelletizer Speed Setting | 10 | 10 | 10 | 15 |
| Pellet wt, gm | 0.0182 | 0.0184 | 0.0184 | 0.0182 |
| Bulk density g/cc | 0.793 | 0.763 | 0.740 | 0.706 |
| Pellet length, mm | 3 | 3 | 3 | 3 |
| Major axis, mm | 2.72 | 2.45 | 2.48 | 2.58 |
| Minor axis, mm | 1.87 | 2.24 | 2.35 | 2.36 |
| Axis ratio | 1.45 | 1.09 | 1.06 | 1.09 |
| Pellet cavity diameter, mm | — | 0.25 | 0.35 | 0.72 |
| Gap in pellet, mm | — | — | 0.11 | 0.39 |

TABLE II

I.V.'s of Samples of PET Pellets Taken During Solid State Polymerization at 220° C.

| SSP Time,hr | S Pellets | O Pellets | Q Pellets | C Pellets |
| --- | --- | --- | --- | --- |
| 0 | 0.590 | 0.589 | 0.590 | 0.591 |
| 1 | 0.615 | 0.641 | 0.640 | 0.660 |
| 2 | 0.661 | 0.689 | 0.695 | 0.700 |
| 3.5 | 0.714 | 0.755 | 0.758 | 0.765 |
| 5 | 0.765 | 0.810 | 0.812 | 0.819 |
| 7 | 0.805 | 0.864 | 0.875 | 0.882 |
| 10 | 0.883 | 0.939 | 0.956 | 0.958 |
| 14 | 0.955 | 1.025 | 1.050 | 1.067 |
| 18 | 1.013 | 0.126 | 1.140 | 1.152 |
| 23 | 1.105 | 1.192 | 1.216 | 1.221 |

TABLE III

Reaction Rate and Productivity improvements of Pellets with Open-ended Cavities over Standard Pellets in Continuous Solid State Polymerization

| Pellet Type | S | O | Q | C |
| --- | --- | --- | --- | --- |
| A. Product I.V. = 0.84 dl/g for bottle applications | | | | |
| SSP time Required, hr | 8.2 | 6.1 | 5.8 | 5.6 |
| Avg. SSP rate dl/g/hr | 0.0305 | 0.0410 | 0.0431 | 0.0446 |
| SSP rate ratio | 1.000 | 1.344 | 1.413 | 1.461 |
| % productivity Advantage | — | 29.3 | 31.9 | 30.2 |
| B. Product I.V. = 0.95 dl/g for food tray applications. | | | | |
| SSP time required, hrs | 13.8 | 10.2 | 9.7 | 9.4 |
| Avg. SSP rate dl/g/hr | 0.0261 | 0.0353 | 0.0371 | 0.0333 |
| SSP rate ratio | 1.000 | 1.352 | 1.421 | 1.467 |
| % Productivity advantage | — | 30.1 | 32.6 | 30.6 |

TABLE IV

I.V.'s of Samples Taken During Solid State Polymerization of PEN Standard Pellets and Pellets with Open-ended Cavities

| SSP time, hr | Standard Pellets (S-Pellets) | Pellets with Open-ended Cavities (O-Pellets) |
|---|---|---|
| 0 | 0.4830 | 0.4830 |
| 1 | 0.506 | 0.526 |
| 2 | 0.534 | 0.562 |
| 3.3 | 0.570 | 0.613 |
| 5 | 0.595 | 0.653 |
| 7 | 0.631 | 0.696 |
| 10 | 0.670 | 0.755 |
| 14 | 0.711 | 0.792 |
| 18 | 0.754 | 0.845 |
| 24 | 0.795 | 0.887 |

What is claimed is:

1. In a process for preparing a polyester polymer by melt polymerization to produce a polyester prepolymer having an intrinsic viscosity of from about 0.25 dl/g to about 0.75 dl/g, followed by solid state polymerization, the improvement comprising extruding the polyester prepolymer through a die designed to form tubular molten strands, quenching the molten strands, and chopping the strands into open-ended pellets of a size and shape suitable for solid state polymerization.

2. The process of claim 1 wherein the extruded pellets are open at both ends and have an "O"-shaped cross-section.

3. The process of claim 1 wherein the extruded pellets are open at both ends and open to the side, and the pellets have a "C"-shaped cross-section.

4. The process of claim 3 wherein the side opening of the "C"-shaped pellets is narrower than one-fifth the pellet diameter.

5. The process of claim 3 wherein the prepolymer is a poly(ethylene terephthalate) polymer having an intrinsic viscosity of about 0.59 dl/g or more.

6. The process of claim 3 wherein the prepolymer is a poly(ethylene naphthalate) polymer having an intrinsic viscosity of about 0.48 dl/g or more.

7. The process of claim 1 wherein a solid-state polymerized polyester polymer having an intrinsic viscosity of about 0.84 dl/g or more is produced with a solid state polymerization residence time of about six hours or less from a polyester prepolymer with an intrinsic viscosity of about 0.59 dl/g, and the polyester polymer is poly(ethylene terephthalate).

8. The process of claim 1 wherein a solid-state polymerized polyester polymer having an intrinsic viscosity of about 0.95 dl/g or more is produced with a solid state polymerization residence time of about ten hours or less.

9. The solid state polymerized polyester product of the process of claim 1.

10. In a process for preparing a pelletized polyester prepolymer having an intrinsic viscosity of from about 0.25 dl/g to about 0.75 dl/g by melt polymerization followed by extrusion into pellets, the improvement wherein the polyester prepolymer is extruded into molten tubular strands which are quenched and chopped into open-ended pellets of a size and shape suitable for solid-state polymerization.

11. The process of claim 10 wherein the extruded pellets are open at both ends and have an "O"-shaped cross-section.

12. The process of claim 10 wherein the extruded pellets are open at both ends and open to the side, and the pellets have a "C"-shaped cross-section.

13. The process of claim 12 wherein the side opening of the "C"-shaped pellets is narrower than one-fifth the pellet diameter.

14. The process of claim 1 in which the average pellet weight is between 1 gram and 3 grams per 100 pellets and the length is 2 mm to 3 mm.

15. The process of claim 1 in which the polyester prepolymer is comprises of repeat units derived from a diacid component and a diol component in which the diacid component is selected from the group consisting of dicarboxylic acids that contain from 4 to 36 carbon atoms, diesters of alkyl dicarboxylic acids which contain from 6 to 38 carbon atoms, aryl dicarboxylic acids which contain from 8 to 20 carbon atoms, diesters of aryl dicarboxylic acids which contain from 10 to 22 carbon atoms, alkyl substituted aryl dicarboxylic acids which contain from 9 to 22 carbon atoms, and diesters of alkyl substituted aryl dicarboxylic acids which contain from 11 to 22 carbon atoms, and in which the diol component is selected from the group consisting of glycols containing from 2 to 12 carbon atoms, glycol ethers containing from 4 to 12 carbon atoms, and polyether glycols having the structural formula HO—(A—O)$_n$—H wherein A is an alkylene group containing from 2 to 6 carbon atoms and wherein n is an integer from 2 to 400.

16. The process of claim 1 in which the prepolymer is poly(ethylene terephthalate).

17. The process of claim 1 in which the prepolymer is poly(ethylene naphthalate).

* * * * *